United States Patent [19]

Elliott et al.

[11] 4,430,725
[45] Feb. 7, 1984

[54] METHOD FOR DISPLAYING SOURCE AND DESTINATION FILE HEADERS FOR EASY COMPARISON OF PROPOSED HEADER CHANGES

[75] Inventors: Jo A. Elliott; John W. McInroy; Paul D. Waldo, all of Austin, Tex.

[73] Assignee: International Business Machines Corporation, Armonk, N.Y.

[21] Appl. No.: 264,270

[22] Filed: May 18, 1981

[51] Int. Cl.³ ............................................. G06F 3/153
[52] U.S. Cl. ...................................... 364/900; 340/709
[58] Field of Search ... 364/200 MS File, 900 MS File, 364/300; 340/723, 734; 178/30

[56] References Cited

U.S. PATENT DOCUMENTS

| | | | |
|---|---|---|---|
| 3,364,473 | 1/1968 | Reitz | 364/900 |
| 3,971,000 | 7/1976 | Cromwell | 340/734 X |
| 4,057,849 | 11/1977 | Ying | 364/900 X |
| 4,070,710 | 1/1978 | Sukonick | 364/900 |
| 4,204,206 | 5/1980 | Bakula | 364/900 X |

OTHER PUBLICATIONS

DeBruyn, A. J., Leimer, J. J., and Pujdowski, R. "Character Attributes for an Alphanumeric Display", *IBM Technical Disclosure Bulletin*, vol. 21, No. 4, (Sep. 1978), pp. 1608–1609, S90070134.

*Primary Examiner*—Edward J. Wise
*Attorney, Agent, or Firm*—Richard E. Cummins

[57] ABSTRACT

An improved method is disclosed for providing to the operator of an interactive text processing system a displayed summary confirming the effect of requested changes to the field order in an existing file of spatially related data stored in the system prior to creation of new file.

The method involves simultaneously displaying to the operator on one screen the header portions of the existing source file and the destination file and causing the data in predetermined fields of each header to be displayed in a manner which is different than the manner in which the data in the remaining fields of said headers is displayed so as to manifest to the operator similar treatment by the system of the data in both headers which is similarly displayed.

The header portion of the source file is displayed such that those fields which are not to be copied into the destination file are reverse video displayed, while those fields which are to be copied to the destination file are in normal display. The header portion in the destination file is displayed such that those fields which appear in the existing file and which are to receive data from the source file are displayed in normal manner, while fields which are not to receive data from the source file are reverse video displayed. The resulting display then manifests to the operator those fields which will be copied from the source file to the destination file and provides the opportunity for the operator to confirm the correctness of the interactively entered instructions prior to actual creation of the new file.

7 Claims, 6 Drawing Figures

```
H1------------------------------------------------------
H2sPATENTsNUMBERss ------------------------------------
H3------------------------------------------------------
```

FIG. 5

```
Dupl. Selected Recs. |Recruiting File           |         |
DISK01|         |                     |         |Kyb 1    |
```

FROM
File Name:    Patent File
Diskette Name:    DISK01

| Rec ID.|Patent No.|Issue Date|Serial No.|Filing Date|
|   |   |   |   |   |   |

TO
New File Name:    Serial No.
Diskette Name:    DISK02

| Rec ID.|Serial No.|Issue Date|Patent No
|   |   |   |   |   |

FIG. 6

METHOD FOR DISPLAYING SOURCE AND DESTINATION FILE HEADERS FOR EASY COMPARISON OF PROPOSED HEADER CHANGES

DESCRIPTION

TECHNICAL FIELD

This invention relates in general to interactive text processing systems in which selected fields of spatially related data records in one existing file can be transferred to a destination file in accordance with instructions that are supplied to the system interactively by the operator. The invention relates more specifically to an improved method for advising the operator of the interactive text processing system of the nature of the transfers that have been requested of the system between the files.

Related Applications

Ser. No. 264,368, filed May 18, 1981, is directed to a method for displaying and editing spatially related data in an interactive text processing system where the spatially related data is stored in vector format and in which one editing process is used for editing both text and file type data.

Ser. No. 264,387, filed May 18, 1981, is directed to an improved method for assisting an operator in defining to the interactive text processing system how spatially related data from an existing file is to be rearranged for display or copying.

Ser. No. 264,303, filed May 18, 1981, is directed to an improved method for assisting the operator of an interactive text processing system to interactively enter field independent criteria for selecting records from a spatially related data file stored in the system in a vector format.

PRIOR ART

A typical interactive text processing system currently operational in many office environments comprises a keyboard, a display, a printer, a diskette storage device and a microprocessor which has been programmed to cause interaction of the various system components to perform numerous text processing functions. One of the main functions of a text processing system is to create a document on the output printer which may, for example, be a single one-page letter or a multi-page manuscript. The interactive nature of these systems initially involves a query-response type mode of operation where the system displays the questions or available options to the operator and, perhaps, a number of responses. The operator then indicates the response by pressing a defined character key or by keying in the requested data. By such a procedure, the various parameters of a document format may be defined to the system. The system is then placed in the text entry mode so that actual text is keyed in by the operator and displayed on the screen in a format generally resembling that which will appear in the printed document.

It will be appreciated that the text is entered initially as a series of keystrokes, each of which is converted to a byte or character of data in the system that is subsequently stored in the memory of the microprocessor. Most keystrokes that are entered will represent characters of data and will be recognized as such by the microprocessor so that these will be transferred by the microprocessor to the display refresh buffer from which the characters will be displayed on the display screen. It will be recognized also that a limited number of keystrokes generate text format control data, such as a paragraph indent signal achieved by tabbing, or a carriage return signal. These text format bytes are recognized by the microprocessor which provides the required character control signals to the display refresh buffer. The other function of the microprocessor is to supply to the refresh buffer a cursor character signal which is displayed to the operator as an indication where the character representing the next keystroke will be displayed.

In many applications, after all the text has been entered, the operator requests a printed document from the system. The system then enters the printing mode and prints the document, employing the stored format parameters and the text. The document, as stored in memory, comprises a series of data and control characters and is generally stored on the diskette. The name of the document and the diskette number is also added to the index of documents kept by the system. This permits the document record to be subsequently retrieved.

After the printed document has been edited by the author, the operator recalls the document from diskette storage into main memory and causes it to be displayed by the system, which is placed in an update mode. The operator may then position the cursor by operation of cursor move keys to a character position on the display which is to be modified, e.g., to a word to be deleted. The operator merely presses a delete key while moving the cursor through the characters of the word by the cursor control key, and the word is erased in storage by action of the microprocessor and will, therefore, not appear in the updated document.

Those familiar with the internal operation of text processing systems employing microprocessors understand the various detailed steps that the microprocessor takes in converting a simple keystroke into a character on the display screen and to a byte of binary data in a storage location in memory while "simultaneously" controlling the position of the cursor on the display screen to assist the operator to properly format the document.

In most text processing systems, the text data is merely stored sequentially in memory as the sequence of keystrokes occurred, i.e., character data interspersed by the appropriate control data such as paragraph indents, carriage returns, line advances, etc. In many systems, the document format parameters, such as page length, left and right margins, line spacing, type font, etc., are stored independently of the text data and, hence, the text format parameters of the final document can be entirely different than the parameters employed when the text was initially entered into the system.

Sequential keystroke information storage of text data does permit the implementation of a number of different editing functions which enhance the performance and desirability of text processing systems. These functions range from the simple revision feature, such as deleting, adding or changing characters or words, to more sophisticated features, such as checking the spelling of all words in the document against a defined list of words, automatically replacing a defined word with another word at every occurrence in the document, and moving a word from one position on the line to a different position.

Text processing systems of the type described above, however, do not have the capability of easily manipulating data that is spatially related, such as data which is arranged in a matrix of rows and columns. Where it is also desirable to process spatially related data in an interactive text processing system, the prior art systems employ an entirely different set of programs for processing spatially related data. One reason for this is that there is an advantage in storing spatially related data in a vector format since this permits data processing type of functions, i.e., sorting of record fields or repositioning of fields, by the microprocessor quite easily. Since the spatially related data is stored differently in the system than text data, the simple type of editing functions which must also be done on the spatially related data have required in the past their own set of programs stored with the microprocessor. Considerable storage space can be saved if the display and editing processes for text data are also used for displaying and editing data stored in a vector format. The display and editing processes for text data are also employed to display and edit the spatially related data by converting a predetermined amount of the vector stored data to text data. The display and editing processes then function as if the spatially related data were really text.

Such a system is described in copending application Ser. No. 264,368, filed concurrently herewith and assigned to the assignee of the present invention.

In that system, spatially related data is first entered into the text processing system in a conventional query-response mode until all of the potential parameters of the spatial relationship of the data or coordinate system are stored. The system then displays the header portion of the matrix showing, for example, the name and width of each column. The system further positions the cursor at the starting position in the upper left corner, which can be defined as row 1, column 0, character position 0. Data is then entered into each column and is displayed as conventional text data, the cursor being appropriately positioned after each keystroke. The operator also has the capability of moving the cursor one character position at a time in accordance with normal text conventions. Internally, the captured keystrokes are stored in memory as conventional control characters and text data so text can be displayed in a conventional manner. The data of each row subsequently is encoded as a vector where the spatial relationship of the data in the matrix is defined, and the vector is stored for later use.

Subsequent modification of the vector is done either on the encoded vector, if the modification involves a change in the spatial relationship, or on the decoded vector, if the modification is to the actual data. An example of one modification which can be accomplished is the relocation or repositioning in the matrix of rows in accordance with the data in one column, i.e., sorting or collating. Such operations in conventional text processing systems would be extremely cumbersome and time consuming, if not impossible. However, since all the data is identified spatially, it becomes a relatively simple matter for the microprocessor to identify the vector and to modify its spatial parameters in accordance with the desired changes.

If changes to the data per se are desired, the vector is merely decoded and the data displayed as conventional text. The data is then edited in a conventional text processing mode by the same process and programs employed to edit text data, thus avoiding the necessity of a completely new process to edit vector data. After editing, the data is again encoded as a vector for storage.

It is also desirable in such systems to create new files from old files where the arrangement of data in the new file is changed. Such a system and method is disclosed in copending application Ser. No. 264,387, filed concurrently herewith and assigned to the assignee of the present invention.

As described in the last mentioned copending application, modifications to the existing file are made by displaying the header row of the file and operating on the header data as if it were conventional text. As described in that application, if a field in an existing file is not to appear in the new file, the operator merely deleted the field name as if it were a normal text word that was being deleted. Similarly, if a column was to be moved, the title of the column was moved as if it were a normal text word. The various modifications made to the header row of the existing file were captured by the system so that when the operator completed all of the modifications, the system would create the new file and supply it to the output printer.

In that system, there would be a tendency to avoid complex modifications to the header of the existing file since the operator was never quite sure until after the printout was obtained whether or not an error had been made in entering the modifications.

The present invention avoids this situation and avoids the system spending considerable time generating new file printouts which do not conform to the format requested.

SUMMARY OF THE INVENTION

In accordance with the present invention, the system displays to the operator the header portion of the existing file as it appeared prior to any requested modification and the header portion of the new file simultaneously as it will be created by the system from the move and delete edit operations performed by the operator.

For example, assume that the existing file had the following header information:

A   B   C   D   E   F   G and the operator edited the header by (1) deleting columns C and D; (2) moving column B between columns F and G; and (3) moving column E to the beginning of the header. The header of the new file would be displayed simultaneously to the operator with the existing file header, and would be as follows:

| A | B | C | D | E | F | G |
|---|---|---|---|---|---|---|
| E | A | F | B | G |   |   |

In the above, the headers, in effect, represent column names and would actually be displayed in the header portions.

In addition to displaying simultaneously the two header portions, fields in the existing file that are not to be copied into the new file would be highlighted (underlined, as shown) so as to further assist the operator in perceiving the significance of the displayed data in the two header frames.

When the transfer is to another existing file having some common fields, fields in the header of the destination file that are not involved in the transfer are also highlighted.

It is, therefore, an object of the present invention to provide an improved method for advising the operator of an interactive text processing system how the system plans to modify an existing file to create a new file so that the operator can confirm that the requested modifications are to be implemented.

A further object of the present invention is to provide an improved method for advising the operator of an interactive text processing system what fields the system plans to copy from an existing file of spatially related data and in what sequence in order to generate a new file so that if an error has been made in interactively entering edit instructions into the system, these errors will be recognized before the task is executed by the system.

A still further object of the present invention is to display to the operator of an interactive text processing system the header rows of two related files of spatially related data stored in the system and where the names of the fields of each file are related, to display the names in one mode and where the names of the fields in each file are not related to display those names in a different mode.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 5 illustrates the left-most portion of the header record of spatially related data file in the system;

FIG. 6 illustrates the display of the from/to frame as it would appear in the display device of FIG. 1, in accordance with the present invention.

DESCRIPTION OF THE INVENTION

Figure 1:
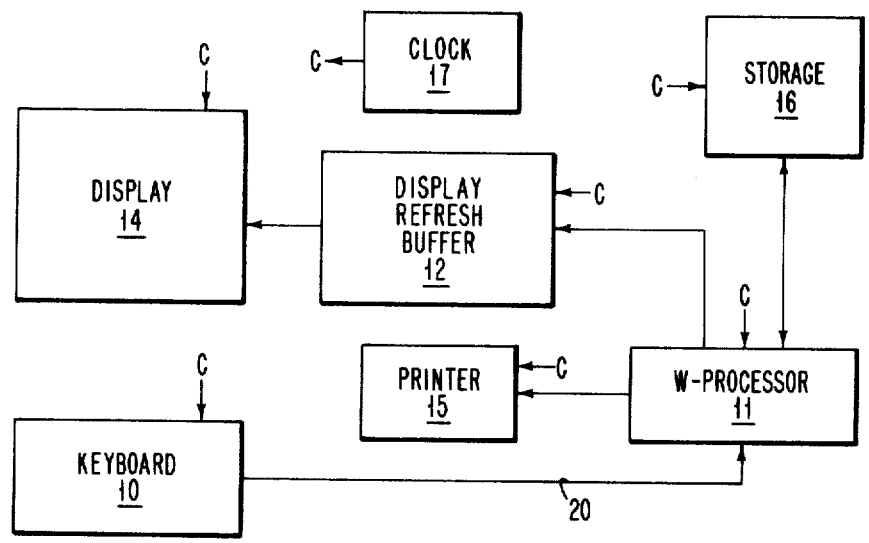
FIG. 1 is a block diagram of an interactive text processing system embodying the present invention.

The invention will now be described as embodied in an interactive text processing system of the type shown in FIG. 1. As shown in FIG. 1, the text processing system illustrated therein comprises a keyboard 10, a microprocessor 11, a display refresh buffer 12, a display device 14, a printer 15, and an auxiliary diskette storage device 16. A clock 17, for keeping the various components of the system in synchronism, is also shown in FIG. 1 and is effectively coupled to each of the units.

Keyboard 10 comprises a normal set of graphic symbol keys such as letters, numbers, punctuation marks, and special character keys, plus text format or control keys like carriage return, indent, etc. In addition, the keyboard includes a second set of control keys for issuing special control commands to the system. The control keys include cursor movement keys, keys for setting the keyboard into a number of different modes, etc.

Figure 2:
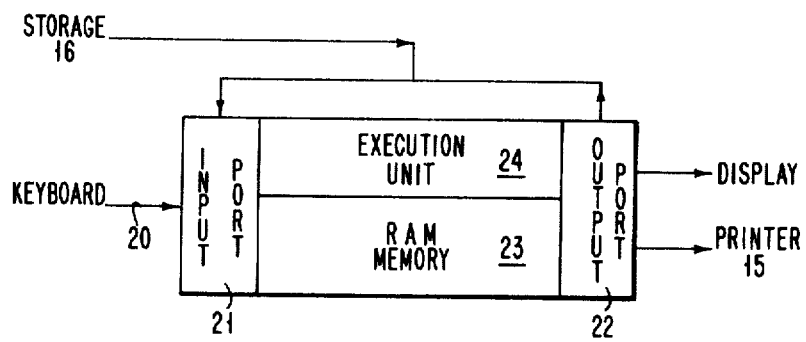
FIG. 2 is a functional diagram of the microprocessor shown in FIG. 1.

The keyboard is connected to the microprocessor by means of a bus 20. The microprocessor, as shown in FIG. 2, comprises an input port 21, an output port 22, a random access memory 23, and a process execution unit 24.

Figure 3:
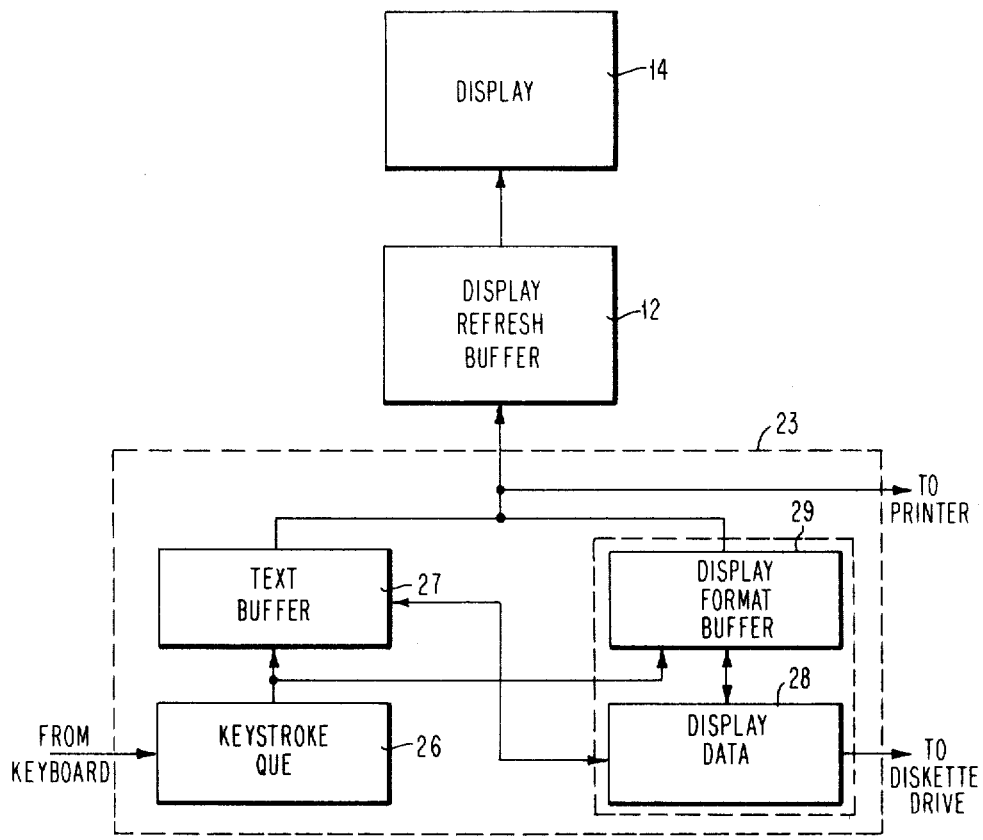
FIG. 3 is a functional diagram illustrating the data flow path between portions of the memory and the microprocessor and the display refresh buffer.

Functionally, memory unit 23 stores both instructions and data in specified sections which will be described in more detail later on in the specification. Data is entered into memory 23 from the keyboard as bytes of binary information through input port 21. As shown in FIG. 3, the section of RAM 23 which receives the keystroke data from the keyboard is designated keystroke queue 26. Data to be displayed is transferred by a series of instructions from queue 26 to the text buffer section 27 and then to the display refresh buffer 12 through output port 22 of the microprocessor. This is achieved in a conventional way by the microprocessor executing a series of move instructions.

The microprocessor 11 may be an INTEL model 8086 or any of the recognized functionally equivalent, currently available microprocessors.

The display refresh buffer 12 is shown as a separate buffer connected between the output port 22 and the display device 14. Buffer 12, in practice, is normally a part of the display device 14 and functions to control the generation of characters on the screen of the display device 14 by exercising on-off control of the beam as it traces a series of horizontal lines across the screen.

The output port 22 also supplies data stored in memory 23 to the printer 15 and diskette storage unit 16, each of which may have their own internal buffers which are not shown. Commands to transfer data from the random access memory 23 to the printer 15 or storage unit 16 are sent to the microprocessor by the operator from the keyboard 10.

Printer 15 may be any suitable printer known in the art. In most text processing systems, the printer is basically a standard input/output terminal printer having a type ball element or a daisy-wheel print element.

Diskette storage 16 may also be any suitable disk storage device which is capable of storing serial by byte data supplied to it at determined sector address locations, each of which are randomly addressable by the microprocessor to retrieve the data. Spatially related data supplied to diskette drive 16 is stored in the display data area 28 of the memory 23 in encoded form. The other section of memory 23 shown in FIG. 3 is the display format buffer area 29 which is involved in the handling of spatially related data in decoded form in accordance with the method of the present invention.

Figure 4:
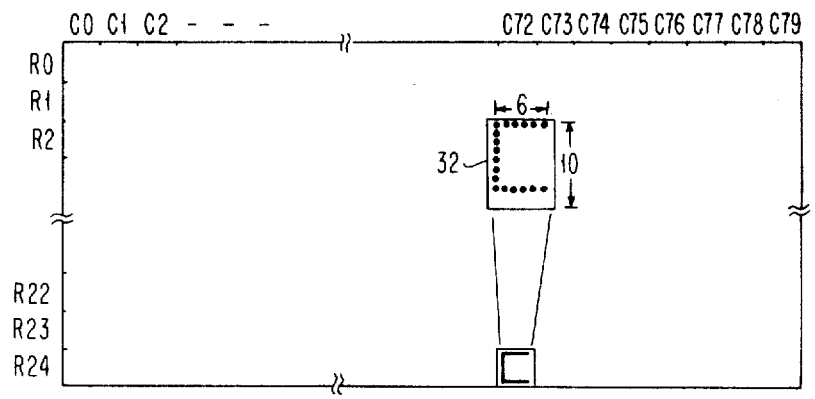
FIG. 4 is a diagrammatic view of the display shown in FIG. 1.

FIG. 4 is a schematic representation of the screen of display device 14. As shown in FIG. 4, the screen has, for example, the capability of displaying 25 lines of characters where each line consists of 80 character column positions. In practice, one character position consists of a matrix of dot positions or picture elements sometimes referred to as pels. A typical character matrix for a display of the type represented by device 14 would be a matrix of six wide by ten high pels, which has been designated by reference character 32 in FIG. 4. The interaction of the refresh buffer 12 and the display 14 is to convert the characters stored at a location in the buffer 12 to the corresponding character as formed in a 6×10 dot matrix at the equivalent location on the display 14. Display 14 generally is provided with its own set of electronics to achieve that conversion. The microprocessor 11 need only supply the address and load the buffer 12 with the appropriate characters.

The diskette storage device 16 also is generally provided with its own set of electronics for converting a byte of data supplied from the display data area 28 of memory 23 through the output port 22 to a serial by bit stream of data to be recorded at a predetermined sector of the one addressed concentric recording track on the diskette. Data from the device is supplied to the microprocessor 11 serial by byte from the addressed sector and storage tracks when requested.

It will be understood that all of the above described functions and interactions involving the microprocessor are achieved through suitable programs which are also stored in memory 23 and which are called into operation in response to data from the keyboard 10 or interrupt signals generated by the various components of the system shown in FIG. 1.

FIG. 5 illustrates the header portion of an existing file as it would be displayed to the operator on the screen of the display device of FIG. 1. The header portion of FIG. 5 is displayed in response to the operator having defined the specific task of creating a new file from an existing file that is stored in the system. This task would be defined to the system in response to the operator viewing a menu which is presented on the display and typing in the appropriate response. Reference should be had to copending application Ser. No. 264,387, filed concurrently herewith and assigned to the assignee of the present invention for a detailed discussion of how the header is created and displayed.

It will be assumed for the purpose of the present invention that the operator has been requested to create a new file from an existing file, as indicated below:

|  | Existing File<br>NAME - PATENT | New File<br>SERIAL |  |
|---|---|---|---|
| Col. 0 | Record Number | Record Number |  |
| 1 | Patent Number | Serial Number |  |
| 2 | Issue Date | Issue Date |  |
| 3 | Serial No. | Patent Number |  |
| 4 | Filing Date | D |  |
| 5 | Assignee | D |  |
| 6 | 1st Inventor | D |  |
| 7 | 2nd Inventor | D |  |
| 8 | 3rd Inventor | D |  |
| 9 | 4th Inventor | D |  |
| 10 | 5th Inventor | D |  |
| 11 | Priority Country | D |  |
| 12 | P. O. Class | D |  |

As shown above, the new file contains a subset of the columns of the existing file, but arranged in a different order. The new file, however, will contain the same number of records as the old file. That is, each record in the source file will have the contents of a subset of its fields copied into a corresponding record in the new file. The details of the various editing operations required to achieve the above are described in copending application Ser. No. 264,387, filed concurrently herewith and assigned to the assignee of the present invention.

The stored data reflecting the move and delete operations is subsequently converted by the microprocessor to column numbers corresponding to the vector formatted data. After all the desired editing operations are completed, and before the system is instructed to create the new file, the operator is presented with a display of the headers of the source file and the destination file, as shown in FIG. 6.

As shown in FIG. 6, the header of the existing file is shown above the header of the new or destination file. As shown, the new file employs only three fields of the existing file, and the system was instructed to rearrange the three fields in a different order, which is depicted in the header of the new destination file. It should be understood that the destination file could have been another existing file in the system having a subset of fields common to the source file. In that situation, the order of the fields in the existing destination file will not change from the order initially defined at the time the file was created.

In either case, the common fields between which the data transfer is to occur will appear on the display in the same mode, while fields in each header not involved in the inter-file transfer will appear in a different mode.

The manner in which the display device is controlled so as to manifest to the operator the fields which are involved in the data transfer operation will now be described briefly.

The display device, in essence, receives control signals from the microprocessor which determine in which mode a given character column on the display will be treated. The character, as it is stored in the refresh buffer, is modified under the control of the microprocessor. As described in copending application Ser. No. 264,387, filed concurrently herewith and assigned to the assignee of the present invention, the refresh buffer is supplied with character information from the display format buffer which, in turn, is supplied with data from the display data area of memory. In building the display format buffer from the display data area, the microprocessor, as a result of comparing a given field in the source file with a given field in the destination file, is in a position to insure that the character that is sent to the display format buffer will be displayed in the normal fashion if the character is in a field which is common to both the destination and the source file. On the other hand, if the character originates in a field which is not common to the two files, then the microprocessor will provide a character to the display format buffer which will appear to be different than the normal mode, such as a reversed video enhancement or a blinking character.

It should be apparent to those persons skilled in the art that, by providing the source and destination header frames to the operator and providing different treatments to the fields involved in the data transfer operation, that system performance will be improved and operator errors will be decreased.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. In an interactive text processing system having a keyboard, a display device, a memory, and a processing unit for processing conventional text data and spatially related data that is stored in said memory in a vector format and in which one or more multi-field records of spatially related vector formatted data of a source file stored in said memory are transferred by said system to a destination file stored in said memory with a different field arrangement defined in accordance with text editing operations performed on the header record of said source file and the header record of said destination file by an operator interacting with said keyboard and said display unit, an improved method of displaying to said operator, after completion of said text editing operations and prior to transferring said one or more multi-field records from said source file to said destination file, the difference in said field arrangements of said header record of said source file and said header record of said destination file, said method comprising:
  (a) displaying to said operator on said display device one display frame containing said header record of said source file as stored in said memory and said header record of said destination file as stored in said memory;
  (b) determining which fields in said header record of said source file are common to the header record of said destination file;
  (c) storing in said memory an indication for each said field that is common to both said headers to control the type of visual treatment afforded to said fields; and
  (d) controlling said display device to cause said common fields to be displayed differently than said fields which are not common in accordance with said stored indication so that said common fields involved in the transfer from said source file to said destination file are readily distinguishable to said operator from any other said fields in said header records prior to said transfer.

2. The method recited in claim 1 in which said destination file is a newly created file and said header of said newly created file record includes a set of fields corresponding to said header record of said source file and in which all fields of both headers are displayed with the same treatment.

3. The method recited in claim 1 in which said header record of said destination file includes a subset of fields displayed in said header record of said source file.

4. The method recited in claim 3 in which said subset of fields in said header record of said destination file is arranged in a sequence different than the sequence of fields in said header record of said source file.

5. The method recited in claim 4 in which the fields which are common to both headers are displayed in a normal treatment and fields in said headers of said source file which are not common to said destination file are displayed in a different treatment.

6. The method recited in claim 1 in which said destination file is a preexisting file having a header record with at least one field which is common to a field in said header record of said source file and at least one field which is not common to any field in said header record of said source file so that in said header records, said common fields have a normal visual display treatment and the uncommon fields have a special visual display treatment.

7. The method recited in claim 6 in which said text processing system includes a microprocessor and said step of determining is done in said microprocessor in accordance with data stored in said memory.

* * * * *